(12) United States Patent
Jiang et al.

(10) Patent No.: US 11,544,569 B2
(45) Date of Patent: Jan. 3, 2023

(54) FEATURE MAP SPARSIFICATION WITH SMOOTHNESS REGULARIZATION

(71) Applicant: TENCENT AMERICA LLC, Palo Alto, CA (US)

(72) Inventors: Wei Jiang, San Jose, CA (US); Wei Wang, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 263 days.

(21) Appl. No.: 17/063,111

(22) Filed: Oct. 5, 2020

(65) Prior Publication Data

US 2021/0158170 A1 May 27, 2021

Related U.S. Application Data

(60) Provisional application No. 62/938,672, filed on Nov. 21, 2019.

(51) Int. Cl.
*G06N 3/08* (2006.01)
*G06K 9/62* (2022.01)
*G06N 3/04* (2006.01)

(52) U.S. Cl.
CPC .......... *G06N 3/084* (2013.01); *G06K 9/6232* (2013.01); *G06N 3/04* (2013.01)

(58) Field of Classification Search
CPC ........ G06K 9/6232; G06N 3/04; G06N 3/084; G06V 10/764; G06V 10/7715; G06V 10/82
See application file for complete search history.

(56) References Cited

U.S. PATENT DOCUMENTS

| | | | |
|---|---|---|---|
| 2010/0179933 A1* | 7/2010 | Bai | G06F 16/313 707/742 |
| 2011/0314367 A1* | 12/2011 | Chang | G06F 16/437 715/230 |
| 2014/0267234 A1* | 9/2014 | Hook | G06T 19/006 345/419 |
| 2016/0174902 A1* | 6/2016 | Georgescu | G06V 10/82 600/408 |
| 2017/0316311 A1* | 11/2017 | Pilly | G06N 3/0454 |
| 2018/0121759 A1* | 5/2018 | Gabrani | G06V 20/695 |
| 2019/0050648 A1* | 2/2019 | Stojanovic | G06V 20/13 |

(Continued)

OTHER PUBLICATIONS

Yunyi Li , "Co-Robust-ADMM-Net: Joint ADMM Framework and DNN for Robust Sparse Composite Regularization," Aug. 28, 2018,Special Section on Theory, Algorithms, and Applications of Sparse Recovery, pp. 47943-47947.*

(Continued)

*Primary Examiner* — Omar S Ismail
(74) *Attorney, Agent, or Firm* — Sughrue Mion, PLLC

(57) ABSTRACT

A method includes receiving an image by a deep neural network (DNN) and obtaining a first feature map based on the image while the DNN is in a trained state, wherein the DNN is configured to perform a task based on the image, and is trained with a training image by using a feature sparsification with smoothness regularization process and a back propagation and weight update process that updates the DNN based on an output of the feature sparsification with smoothness regularization process.

16 Claims, 6 Drawing Sheets

(56) References Cited

U.S. PATENT DOCUMENTS

| | | | | |
|---|---|---|---|---|
| 2019/0251713 | A1* | 8/2019 | Chen | A61B 6/482 |
| 2019/0266748 | A1* | 8/2019 | Ahmad | G06T 7/74 |
| 2019/0340510 | A1* | 11/2019 | Li | G06N 3/082 |
| 2019/0373264 | A1* | 12/2019 | Chong | H04N 19/13 |
| 2020/0244997 | A1* | 7/2020 | Galpin | H04N 19/82 |
| 2020/0388029 | A1* | 12/2020 | Saltz | G06T 7/143 |
| 2022/0147791 | A1* | 5/2022 | Yao | G06V 10/82 |

OTHER PUBLICATIONS

Wei Wen, "Learning Structured Sparsity in Deep Neural Networks," Dec. 5-11, 2016, 30th Conference on Neural Information Processing Systems (NIPS 2016), Barcelona, Spain, pp. 1-7.*

Yiyi Liao, "Understand Scene Categories by Objects: A Semantic Regularized Scene Classifier Using Convolutional Neural Networks," 2016 IEEE International Conference on Robotics and Automation (ICRA) Stockholm, Sweden, May 16-21, 2016, pp. 2318-2324.*

Li-Jia Li, "Object Bank: A High-Level Image Representation for Scene Classification & Semantic Feature Sparsification," Advances in Neural Information Processing Systems 23 (NIPS 2010), pp. 1-7.*

\* cited by examiner

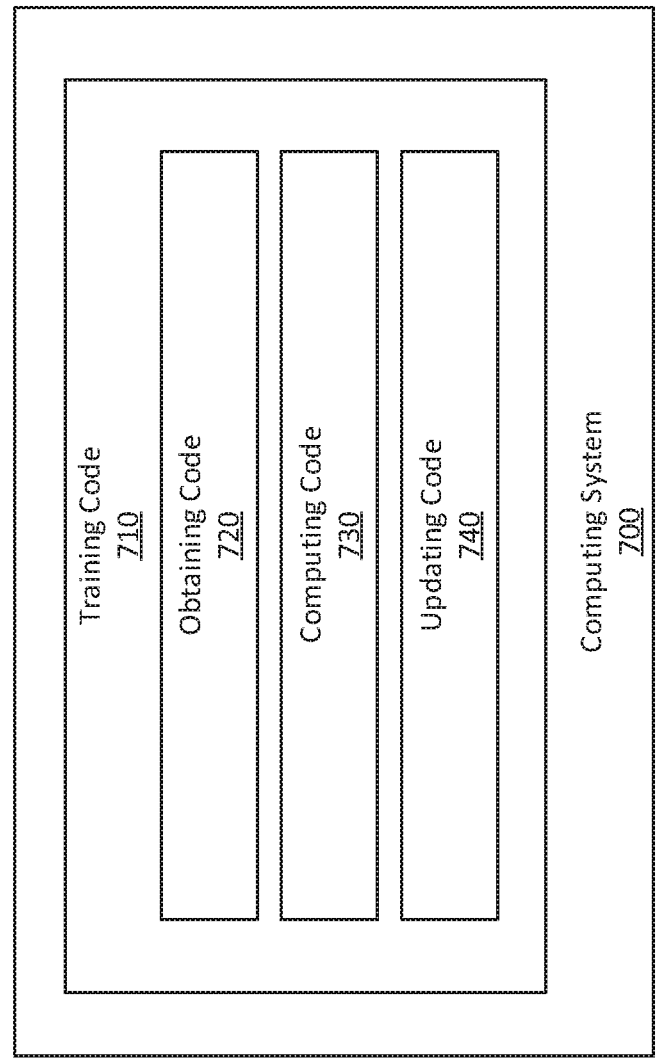

FEATURE MAP SPARSIFICATION WITH SMOOTHNESS REGULARIZATION

CROSS-REFERENCE TO RELATED APPLICATION

This application claims priority from U.S. Provisional Application No. 62/938,672, filed on Nov. 21, 2019, the disclosure of which is incorporated herein by reference in its entirety.

FIELD

Embodiments of this disclosure are directed to video coding and decoding technology, more particularly compression of a feature map generated by a Deep Neural Network (DNN) that is trained by using sparsification with smoothness regularization.

BACKGROUND

ISO/IEC MPEG (JTC 1/SC 29/WG 11) has been actively searching for potential needs for standardization of future video coding technology for visual analysis and understanding. The Compact Descriptors for Visual Search (CDVS) standard was adopted by ISO in 2015 as a still-image standard, which extracts feature representations for image similarity matching. The CDVS standard is listed as Part 15 of MPEG 7 and ISO/IEC 15938-15 and was finalized in 2018, which extracts global and local, hand-designed and DNN-based, feature descriptors for video segments. The success of DNN in a large range of video applications such as semantic classification, target detection/recognition, target tracking, video quality enhancement, etc. poses a strong need for compressing the DNN models. Moving Picture Experts Group (MPEG) is also working on the Coded Representation of Neural Network standard (NNR), which encodes DNN models to save both storage and computation.

In July 2019, a group was formed for the Video Coding for Machine (VCM) standard to explore the topic of "compression coding for machine vision as well as compression for human-machine hybrid system," targeting at developing a standard that can be implemented in chips for broad use with any video-related Internet of Things (IoT) devices. Compared with the previous Compact Descriptors for Video Analysis (CDVA) and CDVS, VCM is an emerging video for machine standard that can be viewed as a superset of CDVA. Through combining multiple feature maps of a neural network backbone, VCM can handle more advanced visual analysis tasks such as semantic segmentation and video restoration.

SUMMARY

Embodiments of the present disclosure provides systems and methods for training a Deep Neural Network by using sparsification with smoothness regularization, and compressing a feature map generated by the DNN after the training.

According to one or more embodiments, a method is provided. The method includes receiving an image by a deep neural network (DNN) implemented by at least one processor; and obtaining, by the DNN, a first feature map based on the image while the DNN is in a trained state, wherein the DNN is configured to perform a task based on the image, and is trained with a training image by using a feature sparsification with smoothness regularization process and a back propagation and weight update process that updates the DNN based on an output of the feature sparsification with smoothness regularization process.

According to an embodiment, the method further includes training the DNN, the training including: obtaining, by the at least one processor, a second feature map based on the training image by performing a network forward computation, by the DNN, that includes the feature sparsification with smoothness regularization process; computing, by the at least one processor, a regularization loss of the second feature map that is based on the training image; computing, by the at least one processor, a smoothness loss of the second feature map that is based on the training image; computing, by the at least one processor, a total gradient based on the regularization loss and the smoothness loss that are computed; and updating, by the at least one processor, network coefficients of the DNN by performing the back propagation and weight update process based on the total gradient that is computed.

According to an embodiment, the training the DNN further includes computing, by the at least one processor, an emperical data loss of the task performed by the DNN, based on the training image, and the computing the total gradient includes computing the total gradient based on the emperical data loss, the regularization loss, and the smoothness loss that are computed.

According to an embodiment, the training the DNN further includes accumulating, by the at least one processor, total gradients of a batch of training data, including the total gradient, and the updating the network coefficients of the DNN is performed based on the total gradients that are accumulated.

According to an embodiment, the training the DNN is performed over multiple iterations, and the training the DNN further includes changing hyperparameters over the iterations such that the training emphasizes learning a sparse feature map, and then emphasizes smoothing feature responses in later ones of the iterations.

According to an embodiment, the training the DNN is performed over multiple iterations, and the training the DNN further includes changing a hyperparameter over the iterations such that the training emphasizes smoothness within spatial dimensions, and then emphasizes channel wide smoothness in later ones of the iterations.

According to an embodiment, the back propagation and weight update process updates network coefficients of the DNN, during the training, based on a regularization loss and a smoothness loss that are computed based on the output of the feature sparsification with smoothness regularization process.

According to an embodiment, the back propagation and weight update process updates network coefficients of the DNN, during the training, based on: a computed regularization loss and a smoothness loss that are computed based on the output of the feature sparsification with smoothness regularization process, and an emperical data loss of the task performed by the DNN that is computed.

According to an embodiment, the method further includes compressing the first feature map.

According to an embodiment, the DNN is configured to perform at least one from among semantic segmentation, image or video classification, object detection, and image or video super-resolution, as the task.

According to one or more embodiment, a system is provided. The system includes at least one memory configured to store computer program code; and a deep neural network (DNN) implemented by at least one processor configured to access the computer program code and operate as instructed by the computer program code. The computer program code includes: obtaining code configured to cause the at least one processor to obtain a first feature map based on an image inputted into the DNN while the DNN is in a trained state, wherein the DNN is configured to perform a task based on the image, and is trained with a training image by using a feature sparsification with smoothness regularization process and a back propagation and weight update process that updates the DNN based on an output of the feature sparsification with smoothness regularization process.

According to an embodiment, the DNN is trained by: obtaining a second feature map based on the training image by performing a network forward computation, by the DNN, that includes the feature sparsification with smoothness regularization process; computing a regularization loss of the second feature map that is based on the training image; computing a smoothness loss of the second feature map that is based on the training image; computing a total gradient based on the regularization loss and the smoothness loss that are computed; and updating network coefficients of the DNN by performing the back propagation and weight update process based on the total gradient that is computed.

According to an embodiment, the DNN is further trained by computing an emperical data loss of the task performed by the DNN, based on the training image, and the total gradient is computed based on the emperical data loss, the regularization loss, and the smoothness loss that are computed.

According to an embodiment, the DNN is further trained by accumulating total gradients of a batch of training data, including the total gradient, and the network coefficients of the DNN is updated based on the total gradients that are accumulated.

According to an embodiment, the DNN is trained by updating the DNN over multiple iterations, and changing hyperparameters over the iterations such that the training emphasizes learning a sparse feature map, and then emphasizes smoothing feature responses in later ones of the iterations.

According to an embodiment, the DNN is trained by updating the DNN over multiple iterations, and changing a hyperparameter over the iterations such that the training emphasizes smoothness within spatial dimensions, and then emphasizes channel wide smoothness in later ones of the iterations.

According to an embodiment, wherein the back propagation and weight update process updates network coefficients of the DNN, during the training, based on a regularization loss and a smoothness loss that are computed based on the output of the feature sparsification with smoothness regularization process.

According to an embodiment, the back propagation and weight update process updates network coefficients of the DNN, during the training, based on: a regularization loss and a smoothness loss that are computed based on the output of the feature sparsification with smoothness regularization process, and an empirical data loss of the task performed by the DNN that is computed.

According to an embodiment, the computer program code further includes compression code configured to cause the at least one processor to compress the first feature map.

According to one or more embodiments, a non-transitory computer-readable medium storing computer instructions is provided. The computer instructions are configured to, when executed by at least one processor implementing a deep neural network (DNN), cause the at least one processor to: obtain a first feature map based on an image inputted into the DNN while the DNN is in a trained state, wherein the DNN is configured to perform a task based on the image, and is trained with a training image by using a feature sparsification with smoothness regularization process and a back propagation and weight update process that updates the DNN based on an output of the feature sparsification with smoothness regularization process.

BRIEF DESCRIPTION OF THE DRAWINGS

Further features, the nature, and various advantages of the disclosed subject matter will be more apparent from the following detailed description and the accompanying drawings in which:

FIG. 7 is a block diagram of a computing system according to an embodiment.

DETAILED DESCRIPTION

Figure 1:
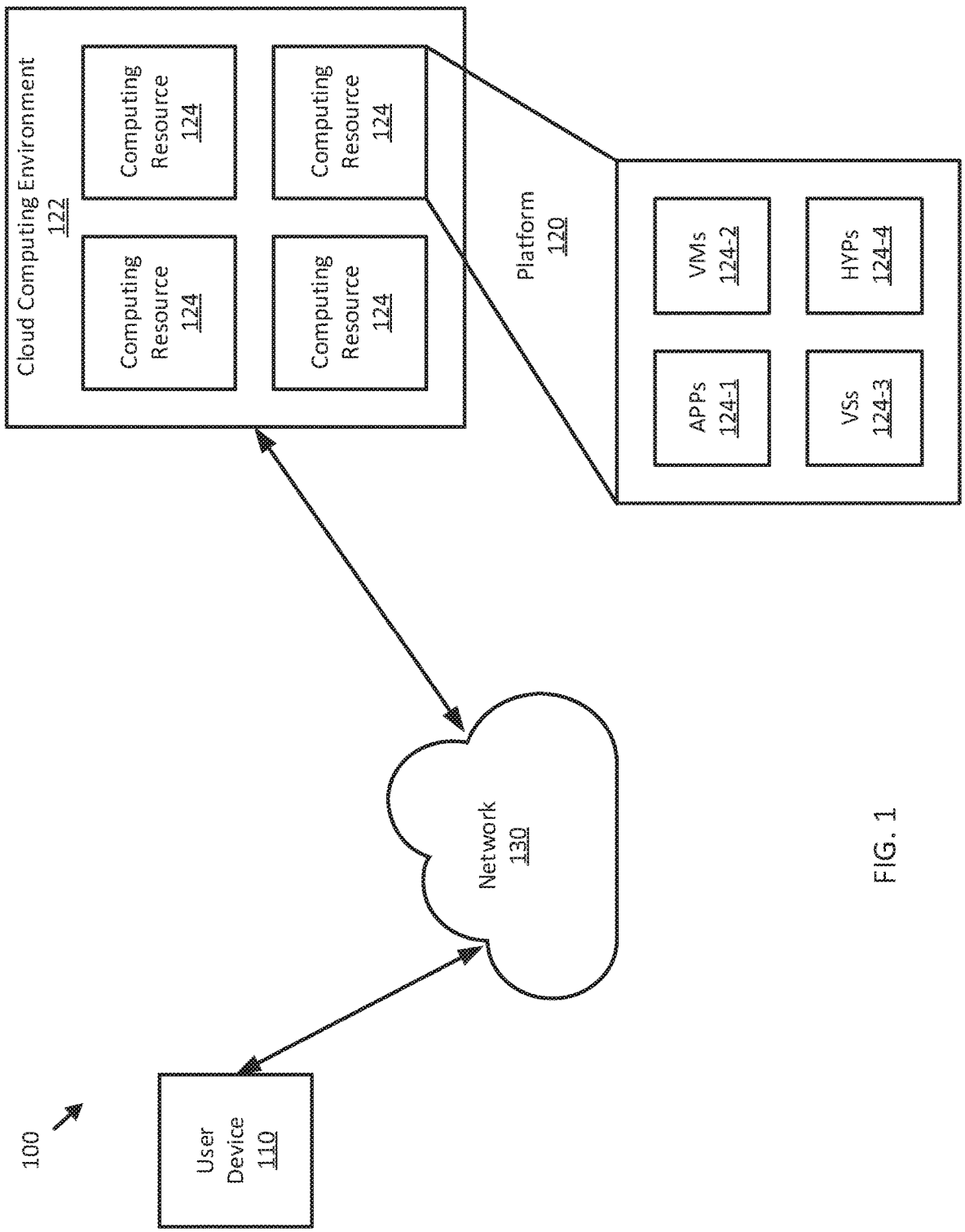
FIG. 1 is a diagram of an environment in which methods, apparatuses, and systems described herein may be implemented, according to embodiments.

FIG. 1 is a diagram of an environment 100 in which methods, apparatuses, and systems described herein may be implemented. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
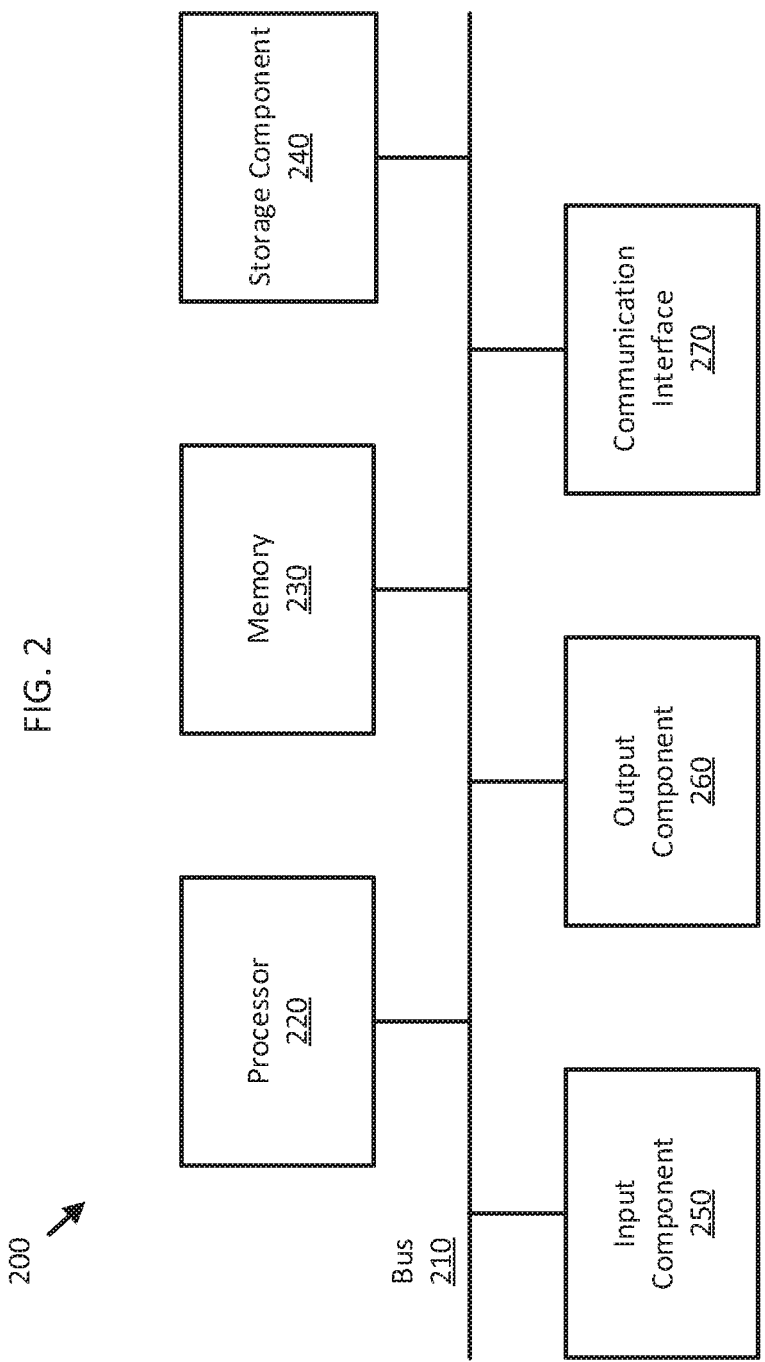
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Embodiments described below may be implemented by one or more components of the environment 100. For example, the embodiments described below may be implemented by the user device 110 or the platform 120. The embodiments described below may be implemented by at least one processor and memory storing computer instructions. The computer instructions may be configured to cause, when executed by the at least one processor, the functions of the embodiments to be performed. For example, the computer instructions may be configured to cause the at least one processor to implement at least one DNN as described below, train the at least one DNN, and compress outputs from the at least one DNN.

[Feature Map Sparsification with Smoothness]

Figure 3:
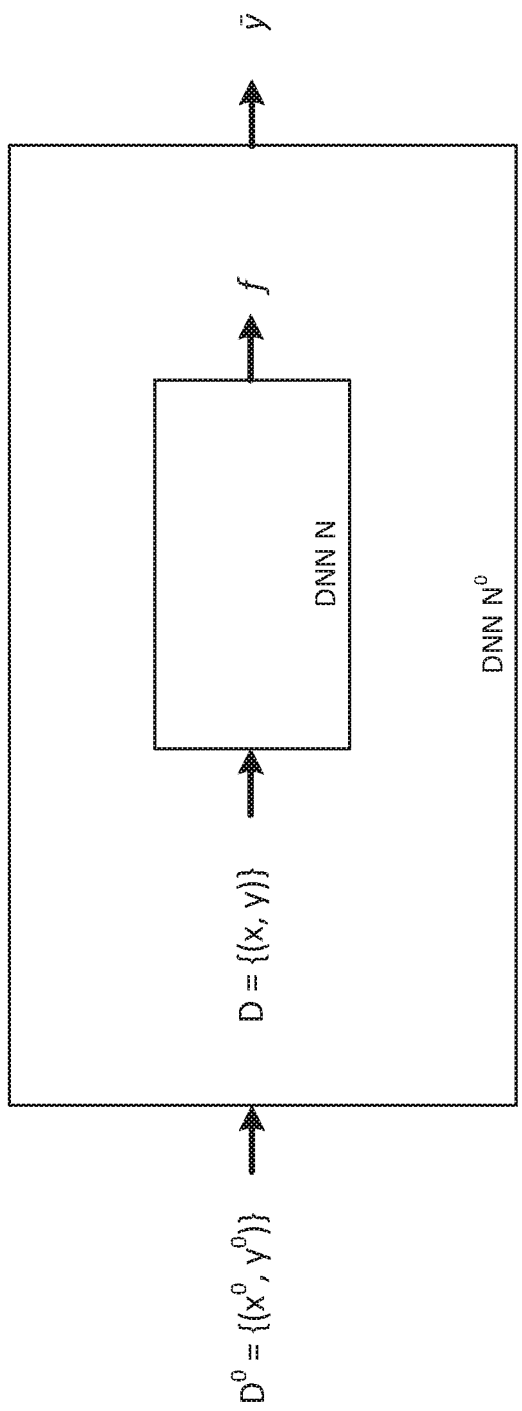
FIG. 3 is a block diagram of a DNN according to embodiments.
Figure 4:
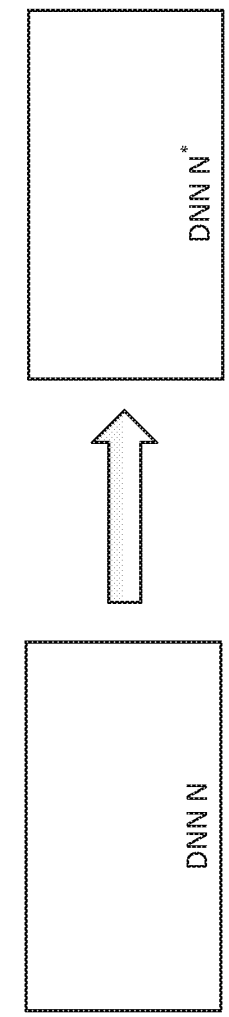
FIG. 4 is a diagram indicating training of a DNN according to embodiments.
Figure 5:
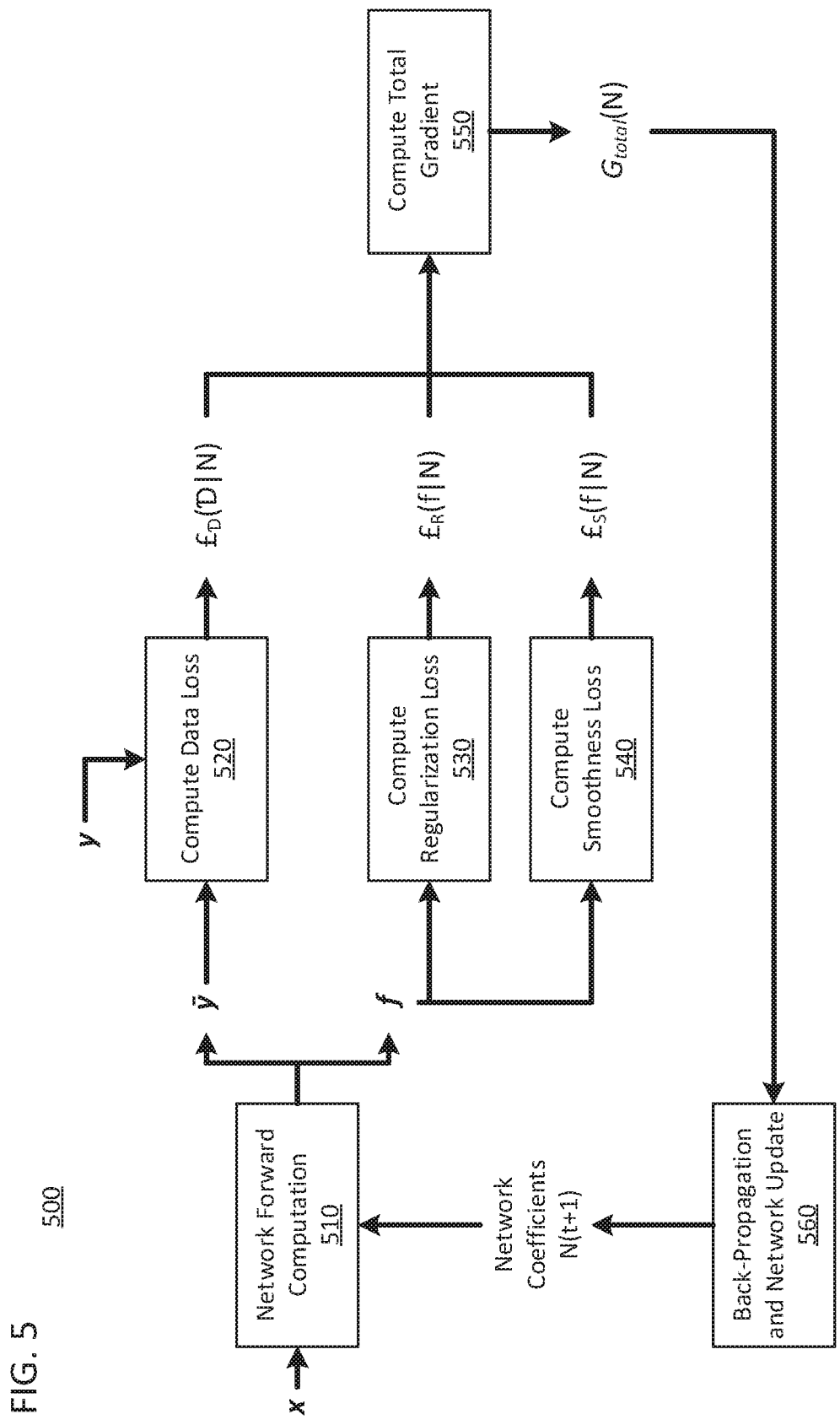
FIG. 5 is a block diagram of a DNN training system according to embodiments.

Referring to FIGS. 3-5, a DNN training system that includes feature map sparsification with smoothness is described.

Let $D=\{(x, f, N)\}$ denote a data set where an input x is passed through a DNN (e.g., DNN N in the diagram 300 of FIG. 3) to generate a feature map f. The DNN N is a subnetwork of another DNN $N^o$ which is trained for some task using a dataset $D^o=\{(x^o,y^o)\}$, where each input $x^o$ is associated with an annotation $y^o$. For example, for the task of semantic segmentation, each input $x^o$ can be a color image and annotation $y^o$ can be a segmentation map of the same resolution as input $x^o$ and each item in the segmentation map can be the index of the semantic category the corresponding pixel in input $x^o$ is assigned to. For the task of super-resolution, input $x^o$ can be a low-resolution image generated from annotation $y^o$, wherein $y^o$ is a ground truth high resolution image. According to embodiments, the DNN N may be the first few layers of the DNN $N^o$ and may be called the backbone (or feature extraction) network of the DNN $N^o$. The data set D can be the same as the data set $D^o$. It can also be a different data set from the data set $D^o$, but with similar data distribution as the data set $D^o$, (e.g. input x and input $x^o$ have the same dimension, and $p(x,y)=p(x^o,y^o)$ where y is the underlying annotation associated with input x).

The feature map f may be a general 3D tensor of size (c, h, w), where h, w, and c are the height, width, and depth of the feature map f. For example, for the semantic segmentation or super-resolution task, h and w can be the same as original height and width of the input x (e.g. image), which determine the resolution of the feature map f. Due to the nature of the DNN computation, such as the convolution followed by a nonlinear activation operation like ReLu and a pooling operation like maxpooling, the feature map f may be quite sparse. That is, many entries of the feature map f (that is the 3D tensor) are zeros, and many entries of the feature map f are close zeros or can be set to zeros with little impact on the computation in the DNN $N^o$ afterwards. Further compression processes such as quantization and entropy coding can be applied to the feature map f that is sparse to largely reduce the size of the feature map f for efficient storage and transmission.

[Smoothness for Compression]

From the perspective of compression, when the feature map f has a smoothness property, the compression efficiency can be greatly improved. For example, when nearby entries of the feature map f have similar values, they can be quantized to a same value without having much impact on the computation later on. Pursuing the smoothness property in the spatial domain is reasonable as the feature map f along the h and w dimension should be smooth in nature, because of the smooth nature of the original input x (e.g. original input image) and the smoothness-preserving convolution operation of the DNN N. From the perspective of feature extraction, features along different channels extract different aspects of information to represent the input x, and the feature map f usually have low responses (low feature values) in most regions. For example, for the task of semantic segmentation, a feature map of one channel may have high response over an object of a semantic category (e.g., a car), and have low response over all other regions. Therefore, for most part of the sparse feature map, it is also reasonable to pursue local smoothness along the channel dimension.

Embodiments of the present disclosure may implement a loss function $\mathcal{L}_S(f)$ to measure the above smoothness property as shown below in Equation (1):

$$L_s(f) = \sum_{g(l,m,n) \in G} S(f, g(l,m,n)) \quad (1)$$

where $g(l, m, n) \in G$ defines a local neighborhood centered at $(l,m,n)$ with size $(M_1(l, m, n), M_2(l, m, n), M_3(l, m, n))$; G is the group of such local neighborhoods; and $S(f, g(l, m, n))$ is a smoothness metric measured over the feature map $f$ for each local neighborhood. In one embodiment, the local neighborhood can have a fixed size for each location $(l,m,n)$, e.g., a 3D blob centered at $(l,m,n)$, and when $$l = \frac{c-1}{2}, m = \frac{h-1}{2}, n = \frac{w-1}{2},$$

and $N_1(l, m, n)=c$, $N_2(l, m, n)=h$, and $N_3(l, m, n)=w$, $g(l, m, n)$ covers the entirety of the feature map $f$.

The smoothness metric can take many forms. An aspect of the metric may be to make the feature responses defined in the neighborhood $g(l, m, n)$ as close to each other as possible (ideally to be the same). In one example embodiment, embodiments of the present disclosure implement the smoothness metric as defined below in Equation (2):

$$S(f, g(l,m,n)) = \beta_l \nabla_l^\rho(f) + \beta_m \nabla_m^\rho(f) + \beta_n \Delta_n^\rho(f) \quad (2)$$

$\nabla_l(f)$, $\nabla_m(f)$, and $\nabla_n(f)$ are further defined as:

$$\nabla_l^\rho(f) = \sum_{p \in N_1(l,m,n)} \sum_{i \in N_2(l,m,n)} \sum_{j \in N_3(l,m,n)} |\partial_1(f_{p,i,j})|^\rho$$

$$\nabla_m^\rho(f) = \sum_{p \in N_1(l,m,n)} \sum_{i \in N_2(l,m,n)} \sum_{j \in N_3(l,m,n)} |\partial_2(f_{p,i,j})|^\rho$$

$$\nabla_n^\rho(f) = \sum_{p \in N_1(l,m,n)} \sum_{i \in N_2(l,m,n)} \sum_{j \in N_3(l,m,n)} |\partial_1(f_{p,i,j})|^\rho$$

where $\partial_1(f_{p,i,j})$, $\partial_2(f_{p,i,j})$, $\partial_3(f_{p,i,j})$ are the absolute value of gradients of the feature map $f$ alone the four axes measured at location $(p,i,j)$, respectively, and $\beta_l$, $\beta_m$, $\beta_n$ are hyperparameters balancing the contributions of the gradients alone different axes. Intuitively, the smoothness metric of Equation (2) encourages that adjacent feature responses within the local neighborhood alone the different axes are similar without dramatic changes. $\rho > 0$ is a hyperparameter and, in an example embodiment, p is empirically set as $\rho = 1$. In one embodiment, the gradient is simply computed as:

$$\partial_1(f_{p,i,j}) = f_{p+1,i,j} - f_{p,i,j}$$

$$\partial_2(f_{p,i,j}) = f_{p,i+1,j} - f_{p,i,j}$$

$$\partial_3(f_{p,i,j}) = f_{p,i,j+1} - f_{p,i,j}$$

[Sparsification with Smoothness]

According to embodiments, the smoothness loss in Equation (1) may be combined with a sparsity regularization loss $L_R(f)$ to promote the compression-friendly feature map during a DNN training process. Given the data set $D=\{(x, f, N)\}$, the feature map $f$ may be actually computed based on the DNN N and the input x, and the feature map $f$ can be represented as a function of the input x and the DNN N: $f=F(x, N)$. As mentioned above, the DNN N may be a part of a bigger network $N^0$ which aims at predicting an output $\bar{y}$ for each corresponding input x. Given a pre-trained DNN $N^0$ where the corresponding network coefficients of the DNN N in DNN $N^0$ is denoted as $N(0)$, embodiments of the present disclosure may be configured to find the updated optimal network coefficients of the DNN (denoted as DNN $N^*$ in the diagram 400 of FIG. 4) by minimizing a training loss $\mathcal{L}(D|N)$. Specifically, $\mathcal{L}(D|N)$ may be defined as a combination of an empirical data loss $\mathcal{L}_D(D|N)$ and the regularization loss as shown below in Equation (3):

$$\mathcal{L}(D|N) = \lambda_D \mathcal{L}_D(D|N) + \lambda_R \mathcal{L}_R(f|N) + \lambda_S \mathcal{L}_S(f|N), \quad (3)$$

All the loss terms in Equation (3) may be conditioned over the network coefficients of DNN N to emphasize the dependence of the loss computation on the network. The form of the empirical data loss $\mathcal{L}_D(D|N)$ may be determined by the specific task defined by the dataset D. For example, the cross-entropy loss may be used for classification tasks, and for semantic segmentation, the per-pixel cross-entropy loss may be used. The sparsity regularization loss $\mathcal{L}_R(f|N)$ can take many forms, and in an example embodiment, the L1L2 norm may be used as shown below in Equation (4):

$$\mathcal{L}_R(f|N) = \varsigma \|f\| + \eta |f|, \quad (4)$$

where $\|f\| = \sum_k f_k^2$, $|f| = \sum_k |f_k|$, and k goes over all data entries $f_k$ in the feature map $f$. $\mathcal{L}_S(f|N)$ may be the same as defined in Equation (1), and as mentioned above, notation 'N' is added here to emphasize the dependency of its computation on the DNN N. Hyperparameters $\lambda_D$, $\lambda_R$, $\lambda_S$, $\varsigma$, and $\eta$ balance the contributions of different terms.

FIG. 5 describes an example framework of a training system 500 for training the optimal DNN $N^*$ using the dataset D with the sparsification with smoothness regularization. Specifically, for training the optimal network, an annotation y is given for each corresponding input x, (e.g. $D=\{(x, y, f, N)\}$). Through a Network Forward Computation process 510, each input x may be passed through a DNN with the same network structure as the original bigger network $N^0$, where the network coefficients for the subnetwork corresponding to the feature extraction DNN (e.g. DNN N) are denoted as $N(t)$, and the remaining network coefficients are denoted as $N^0(t)$. This process may generate an estimated output $\bar{y}$, as well as the feature map $f=F(x, N(t))$. $N(t)$ is initialized as $N(1)=N(0)$ for the first iteration. The network coefficients $N^0(t)$ may be initialized as $N^0$, and in an example embodiment, the network coefficients $N^0(t)$ may also be updated during this training process. Based on the annotation y (e.g. ground-truth annotation) and the estimated output $\bar{y}$, the data loss $\mathcal{L}_D(D|N)$ in Equation (3) can be computed through a Compute Data Loss process 520. Through a Compute Regularization Loss process 530, the regularization loss $\mathcal{L}_R(f|N)$ in Equation (4) can be computed based on the feature map $f$ that is generated. Through a Compute Smoothness Loss process 540, the smoothness loss $\mathcal{L}_S(f|N)$ in Equation (1) can also be computed based on the feature map $f$ that is generated. Then, the gradient of the total loss of Equation (3) can be computed using a Compute Total Gradient process 550 to obtain a total gradient $G_{total}(N)$. Automatic gradient computing methods used by deep learning frameworks such as tensorflow or pytorch can be used here to compute $G_{total}(N)$. Based on the total gradient $G_{total}(N)$, the network coefficients can be updated through back propagation (BP) by using a Back Propagation and Weight Update process 560 to obtain the updated network coefficients $N(t+1)$, and the training system 500 goes to the next iteration. Embodiments of the present disclosure may, in the Back Propagation and Weight Update process 560, choose to accumulate the total gradients $G_{total}(N)$ of a batch of inputs, and only update the network coefficients with the accumulated total gradients. The batch size may be a predefined hyperparameter, and embodiments of the present disclosure may iterate over all training data multiple times where each time is called an epoch. Embodiments of the present disclosure may run multiple epochs until the loss optimization converges. In another embodiment, the network coefficients $N^o(t)$ may be updated with a different frequency from the network coefficients $N(t)$, or even stay unchanged.

During the above iterative training process, the hyperparameters $\lambda_D$, $\lambda_R$, $\lambda_S$, $\varsigma$, $\eta$, $\beta_l$, $\beta_m$, $\beta_n$ can be pre-set and fixed or adaptively changed as the training process progresses. For example, in an example embodiment, $\lambda_S$ may be set to be smaller in early iterations and larger in later iterations so that the training process emphasizes on learning a sparse feature map at first and then smoothing out the remaining feature responses. Also, $\beta_l$ may be set to be smaller in early iterations and larger in later iterations so that the smoothness within the spatial dimensions are emphasized at first and then the channel wide smoothness is pursued over the spatially smoothed feature map.

Figure 6:
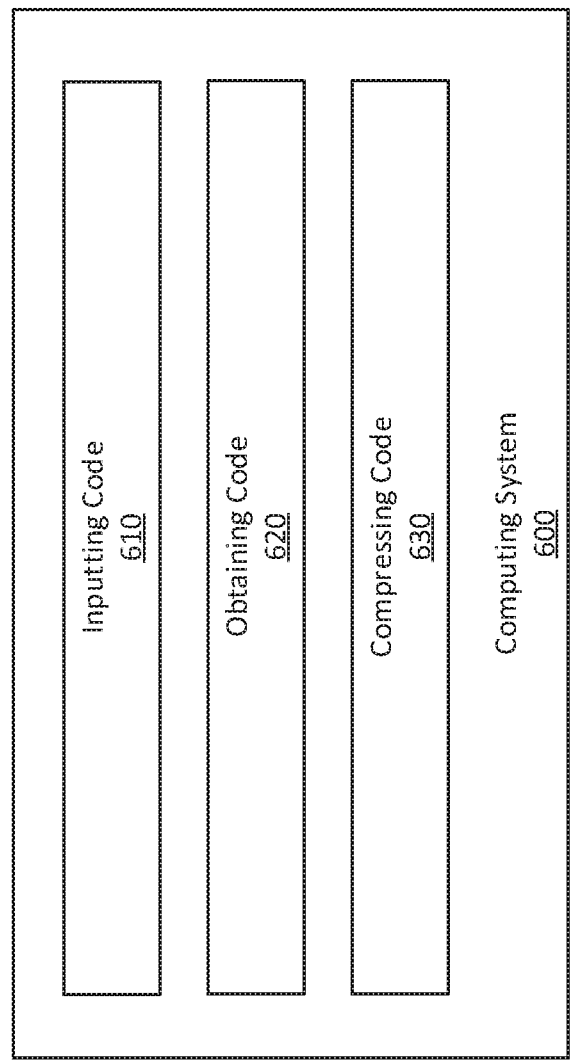
FIG. 6 is a block diagram of a computing system according to an embodiment.

With reference to FIG. 6, embodiments of the present disclosure may be implemented by a computing system 600. The computing system 600 may comprise at least one processor and memory storing computer instructions. The computer instructions may be configured to cause, when executed by the at least one processor, the at least one processor to implement DNNs of the present disclosure. The computer instructions may include inputting code 610, obtaining code 620, and compressing code 630.

The inputting code 610 may be configured to cause the at least one processor to receive an image by a DNN implemented by the at least one processor. The obtaining code 620 may be configured to cause the at least one processor to obtain, by the DNN, a first feature map based on the image. The compressing code 630 may be configured to cause the at least one processor to compress the first feature map.

The DNN, implemented by the at least one processor, may be configured to perform a task based on the image. Additionally, the DNN may be in a trained state based on the training described with reference to FIG. 5.

For example, with reference to FIG. 7, embodiments of the present disclosure may be implemented by a computing system 700 that is configured to train the DNN described with reference to FIGS. 5-6. According to embodiments, the computing system 600 and the computing system 700 may refer to the same computing system or different computing systems. The computing system 700 may comprise at least one processor and memory storing computer instructions. The computer instructions may be configured to cause, when executed by the at least one processor, the at least one processor to implement DNNs of the present disclosure and train the DNNs. For example, the computer instructions may include training code 710 that includes obtaining code 720, computing code 730, and updating code 730.

The training code 710 may be configured train the DNN with one or more training images by using a feature sparsification with smoothness regularization process and a back propagation and weight update process that updates the DNN based on an output of the feature sparsification with smoothness regularization process.

For example, the obtaining code 720 of the training code 710 may be configured to cause the at least one processor to obtain a feature map based on the training image by performing a network forward computation, by the DNN, that includes the feature sparsification with smoothness regularization process. The obtaining code 720 may refer to same code as or different code from the obtaining code 620.

The computing code 730 of the training code 710 may be configured to cause the at least one processor to compute a regularization loss of the feature map, compute a smoothness loss of the feature map, compute an emperical data loss of the task performed by the DNN, based on the training image, and compute a total gradient based on the emperical data loss, the regularization loss, and the smoothness loss that are computed.

According to embodiments, the computing code 730 may be configured to cause the at least one processor accumulate total gradients of a batch of training data, including the total gradient.

The updating code 740 of the training code 710 may be configured to cause the at least one processor to update network coefficients of the DNN by performing the back propagation and weight update process based on the total gradient (or the accumulated total gradients) that is computed.

According to embodiments, the updating code 740 may be configured to cause the at least one processor to update the DNN over multiple iterations, and change hyperparameters over the iterations such that the training emphasizes learning a sparse feature map, and then emphasizes smoothing feature responses in later ones of the iterations.

According to embodiments, the updating code 740 may be configured to cause the at least one processor to update the DNN over multiple iterations, and a hyperparameter over the iterations such that the training emphasizes smoothness within spatial dimensions, and then emphasizes channel wide smoothness in later ones of the iterations.

Embodiments of the present disclosure may be used separately or combined in any order. Further, each of the methods and systems (e.g. coders and decoders) may be implemented by processing circuitry (e.g., one or more processors or one or more integrated circuits). In one example, the one or more processors execute a program that is stored in a non-transitory computer-readable medium.

Embodiments of the present disclosure may have one or more of the following benefits.

The smoothness regularization in combination with the sparsification regularization of embodiments of the present disclosure may improve the efficiency of further compression of extracted feature maps. Through a training process of optimizing the joint loss of both the original learning target and the sparsification with smoothness regularization, the learned DNN may be tailored to extract feature maps that are both effective for performing the original task and suitable for later compression.

Methods of embodiments of the present disclosure can be generally applied to datasets with different data forms. The input data x may be a general 4D tensor, which can be a video segment, a color image, or a gray-level image.

Frameworks of embodiments of the present disclosure can be generally applied to different tasks that extract a feature map from a trained backbone network, such as semantic segmentation, image/video classification, object detection, image/video super-resolution, etc.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, it should be understood that software and hardware may be designed to implement the systems and/or methods based on the description herein.

Even though combinations of features are recited in the claims and/or described in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
receiving an image by a deep neural network (DNN) implemented by at least one processor; and
obtaining, by the DNN, a first feature map based on the image while the DNN is in a trained state, wherein
the DNN is configured to perform a task based on the image, and is trained with a training image by using a feature sparsification with smoothness regularization process and a back propagation and weight update process that updates the DNN based on an output of the feature sparsification with smoothness regularization process, and
the method further comprises training the DNN, the training comprising:
obtaining, by the at least one processor, a second feature map based on the training image by performing a network forward computation, by the DNN, that includes the feature sparsification with smoothness regularization process;
computing, by the at least one processor, a regularization loss of the second feature map that is based on the training image;
computing, by the at least one processor, a smoothness loss of the second feature map that is based on the training image;
computing, by the at least one processor, a total gradient based on the regularization loss and the smoothness loss that are computed; and
updating, by the at least one processor, network coefficients of the DNN by performing the back propagation and weight update process based on the total gradient that is computed.

2. The method of claim 1, wherein
the training the DNN further comprises computing, by the at least one processor, an empirical data loss of the task performed by the DNN, based on the training image, and
the computing the total gradient comprises computing the total gradient based on the empirical data loss, the regularization loss, and the smoothness loss that are computed.

3. The method of claim 1, wherein
the training the DNN further comprises accumulating, by the at least one processor, total gradients of a batch of training data, including the total gradient, and
the updating the network coefficients of the DNN is performed based on the total gradients that are accumulated.

4. The method of claim 1, wherein
the training the DNN is performed over multiple iterations, and the training the DNN further comprises changing hyperparameters over the iterations such that the training emphasizes learning a sparse feature map, and then emphasizes smoothing feature responses in later ones of the iterations.

5. The method of claim 1, wherein
the training the DNN is performed over multiple iterations, and the training the DNN further comprises changing a hyperparameter over the iterations such that the training emphasizes smoothness within spatial dimensions, and then emphasizes channel wide smoothness in later ones of the iterations.

6. A method comprising:
receiving an image by a deep neural network (DNN) implemented by at least one processor; and
obtaining, by the DNN, a first feature map based on the image while the DNN is in a trained state, wherein
the DNN is configured to perform a task based on the image, and is trained with a training image by using a feature sparsification with smoothness regularization process and a back propagation and weight update process that updates the DNN based on an output of the feature sparsification with smoothness regularization process, and
the back propagation and weight update process updates network coefficients of the DNN, during the training, based on:
a regularization loss and a smoothness loss that are computed based on the output of the feature sparsification with smoothness regularization process, and
an empirical data loss of the task performed by the DNN that is computed.

7. The method of claim 1, further comprising compressing the first feature map.

8. The method of claim 1, wherein the DNN is configured to perform at least one from among semantic segmentation, image or video classification, object detection, and image or video super-resolution, as the task.

9. A system comprising:
at least one memory configured to store computer program code; and
a deep neural network (DNN) implemented by at least one processor configured to access the computer program code and operate as instructed by the computer program code, the computer program code including:
obtaining code configured to cause the at least one processor to obtain a first feature map based on an image inputted into the DNN while the DNN is in a trained state, wherein
the DNN is configured to perform a task based on the image, and is trained with a training image by using a feature sparsification with smoothness regularization process and a back propagation and weight update process that updates the DNN based on an output of the feature sparsification with smoothness regularization process, and the DNN is trained by:
  obtaining a second feature map based on the training image by performing a network forward computation, by the DNN, that includes the feature sparsification with smoothness regularization process;
  computing a regularization loss of the second feature map that is based on the training image;
  computing a smoothness loss of the second feature map that is based on the training image;
  computing a total gradient based on the regularization loss and the smoothness loss that are computed; and
  updating network coefficients of the DNN by performing the back propagation and weight update process based on the total gradient that is computed.

10. The system of claim 9, wherein the DNN is further trained by:
  computing an empirical data loss of the task performed by the DNN, based on the training image, and
  the total gradient is computed based on the empirical data loss, the regularization loss, and the smoothness loss that are computed.

11. The system of claim 9, wherein
  the DNN is further trained by accumulating total gradients of a batch of training data, including the total gradient, and
  the network coefficients of the DNN is updated based on the total gradients that are accumulated.

12. The system of claim 9, wherein the DNN is trained by updating the DNN over multiple iterations, and changing hyperparameters over the iterations such that the training emphasizes learning a sparse feature map, and then emphasizes smoothing feature responses in later ones of the iterations.

13. The system of claim 9, wherein the DNN is trained by updating the DNN over multiple iterations, and changing a hyperparameter over the iterations such that the training emphasizes smoothness within spatial dimensions, and then emphasizes channel wide smoothness in later ones of the iterations.

14. A system comprising:
  at least one memory configured to store computer program code; and
  a deep neural network (DNN) implemented by at least one processor configured to access the computer program code and operate as instructed by the computer program code, the computer program code including:
    obtaining code configured to cause the at least one processor to obtain a first feature map based on an image inputted into the DNN while the DNN is in a trained state, wherein
    the DNN is configured to perform a task based on the image, and is trained with a training image by using a feature sparsification with smoothness regularization process and a back propagation and weight update process that updates the DNN based on an output of the feature sparsification with smoothness regularization process, and
  the back propagation and weight update process updates network coefficients of the DNN, during the training, based on:
    a regularization loss and a smoothness loss that are computed based on the output of the feature sparsification with smoothness regularization process, and
    an empirical data loss of the task performed by the DNN that is computed.

15. The system of claim 9, the computer program code further comprises compression code configured to cause the at least one processor to compress the first feature map.

16. A non-transitory computer-readable medium storing computer instructions that are configured to, when executed by at least one processor implementing a deep neural network (DNN), cause the at least one processor to:
  obtain a first feature map based on an image inputted into the DNN while the DNN is in a trained state, wherein
  the DNN is configured to perform a task based on the image, and is trained with a training image by using a feature sparsification with smoothness regularization process and a back propagation and weight update process that updates the DNN based on an output of the feature sparsification with smoothness regularization process,
  the computer instructions are further configured to cause the at least one processor to train the DNN by:
    obtaining, by the at least one processor, a second feature map based on the training image by performing a network forward computation, by the DNN, that includes the feature sparsification with smoothness regularization process;
    computing, by the at least one processor, a regularization loss of the second feature map that is based on the training image;
    computing, by the at least one processor, a smoothness loss of the second feature map that is based on the training image;
    computing, by the at least one processor, a total gradient based on the regularization loss and the smoothness loss that are computed; and
    updating, by the at least one processor, network coefficients of the DNN by performing the back propagation and weight update process based on the total gradient that is computed.

* * * * *